(12) United States Patent
Bender et al.

(10) Patent No.: US 7,996,631 B1
(45) Date of Patent: Aug. 9, 2011

(54) SYSTEM AND METHOD FOR ACCESSING STORAGE DEVICES ATTACHED TO A STATELESS CLIENT

(75) Inventors: Michael S. Bender, Boulder Creek, CA (US); Aloysius C. Ashley Wijeyeratnam, Newark, CA (US)

(73) Assignee: Oracle America, Inc., Redwood, CA (US)

( * ) Notice: Subject to any disclaimer, the term of this patent is extended or adjusted under 35 U.S.C. 154(b) by 1912 days.

(21) Appl. No.: 10/780,270

(22) Filed: Feb. 17, 2004

(51) Int. Cl.
G06F 12/00 (2006.01)

(52) U.S. Cl. .................................. 711/154; 709/203

(58) Field of Classification Search .................. 711/154; 709/203
See application file for complete search history.

(56) References Cited

U.S. PATENT DOCUMENTS

| | | | |
|---|---|---|---|
| 5,305,461 A | 4/1994 | Feigenbaum et al. | |
| 5,809,140 A | 9/1998 | Rubin et al. | |
| 5,961,601 A | 10/1999 | Iyengar | |
| 6,035,404 A | 3/2000 | Zhao | |
| 6,041,357 A | 3/2000 | Kunzelman et al. | |
| 6,170,017 B1 | 1/2001 | Dias et al. | |
| 6,205,124 B1 | 3/2001 | Hamdi | |
| 6,226,750 B1 | 5/2001 | Trieger | |
| 6,363,478 B1 | 3/2002 | Lambert | |
| 6,438,550 B1 * | 8/2002 | Doyle et al. | 707/9 |
| 6,460,071 B1 | 10/2002 | Hoffman | |
| 6,490,624 B1 | 12/2002 | Sampson et al. | |
| 6,829,356 B1 * | 12/2004 | Ford | 380/44 |
| 6,892,307 B1 | 5/2005 | Wood et al. | |
| 7,103,760 B1 * | 9/2006 | Billington et al. | 713/1 |
| 2001/0032235 A1 * | 10/2001 | Madany et al. | 709/203 |
| 2001/0047454 A1 * | 11/2001 | Soderstrom et al. | 711/118 |
| 2002/0099634 A1 * | 7/2002 | Coutts et al. | 705/35 |
| 2003/0014476 A1 * | 1/2003 | Peterson | 709/203 |
| 2003/0014587 A1 * | 1/2003 | Bouvier et al. | 711/114 |
| 2003/0056063 A1 * | 3/2003 | Hochmuth et al. | 711/152 |
| 2004/0064461 A1 * | 4/2004 | Pooni et al. | 707/100 |
| 2005/0091212 A1 * | 4/2005 | Mohamed et al. | 707/9 |
| 2005/0160150 A1 * | 7/2005 | Kao | 709/212 |

OTHER PUBLICATIONS

"Sun Ray™ Overview—White Paper," Sun Microsystems, Inc., Apr. 2003, (28 Pages).

* cited by examiner

*Primary Examiner* — Hashem Farrokh
(74) *Attorney, Agent, or Firm* — Robert C. Kowert; Meyertons, Hood, Kivlin, Kowert & Goetzel, P.C.

(57) ABSTRACT

A system and method for accessing storage devices attached to a stateless client. In one embodiment, the system may include a server configured to execute an application and a stateless client coupled to the server, whereby a user interacts with the application. The system may further include a storage device locally coupled to the stateless client, where the storage device is accessible by the user via the server. In various specific implementations of the system, the storage device may be a solid-state mass storage device or a mass storage device employing magnetic or optical media. In another specific implementation of the system, the storage device may be locally coupled to the stateless client via an interface such as Universal Serial Bus (USB) or IEEE 1394 (e.g. FireWire).

21 Claims, 7 Drawing Sheets

SYSTEM AND METHOD FOR ACCESSING STORAGE DEVICES ATTACHED TO A STATELESS CLIENT

BACKGROUND OF THE INVENTION

1. Field of the Invention

This invention relates to computer systems and, more particularly, to client/server systems employing stateless clients.

2. Description of the Related Art

One common architecture for providing computing services to a number of users is the client/server architecture. Generally speaking, client/server architectures provide one or more server computer systems, each of which may be configured to provide some type of computing service to users via one or more client computer systems. Computing services provided by servers on behalf of clients may include email services, web hosting/internet access, database services, or any other type of software application or service. Often, multiple client systems will share access to a smaller number of server systems.

In typical client/server architectures, a given server system is more computationally powerful than a given client system. For example, a server system may typically include faster and/or multiple processors, more system memory, greater storage resources, greater storage/network bandwidth, etc. than a typical client system. However, in many client/server architectures, client systems are structurally similar to server systems, in that both types of systems may include local processing and storage capability, and both types of systems may be capable of running operating systems and application programs.

In some instances, the number of client systems in a given installation may greatly exceed the number of server systems, for example in enterprise environments where the services to be provided are not individually resource-intensive (e.g., email, web browsing, office applications) but are provided to a large number of users. Providing each user in such an installation with a client system including a processor, local storage, an operating system, and applications may result in substantial administrative costs, as such systems typically need to be upgraded, repaired, patched, or replaced over time. For example, security or functionality patches may be frequently issued for some operating systems, and preserving system integrity and availability may require that such patches are applied to each client system in a timely fashion. In turn, such patching may require individual intervention on the part of a system administrator or a complex automated system for centrally managing the configuration of client systems.

Alternatively, a client/server installation may employ stateless client systems. Typically, stateless client systems lack inbuilt application processing or storage resources. Rather than execute an operating system or applications, stateless clients may be configured to allow a user to access an operating system and applications running on a server system. In such an installation, administrative costs may be greatly reduced, as individual client patching and upgrading may be generally unnecessary, and simpler stateless client design may increase client reliability.

Users of client/server systems may often have the need or desire to be able to use removable or portable storage media with their applications. For example, users may wish to access data stored on optical or magnetic disks or other types of storage media. However, typical stateless clients do not include support for local storage devices. In particular, since typical stateless clients do not run operating system software locally, they do not provide the capability of locally interfacing to storage devices.

SUMMARY OF THE INVENTION

Various embodiments of a system and method for accessing storage devices attached to a stateless client are disclosed. In one embodiment, the system may include a server configured to execute an application and a stateless client coupled to the server, whereby a user interacts with the application. The system may further include a storage device locally coupled to the stateless client, where the storage device is accessible by the user via the server.

In various specific implementations of the system, the storage device may be a solid-state mass storage device or a mass storage device employing magnetic or optical media. In another specific implementation of the system, the storage device may be locally coupled to the stateless client via a Universal Serial Bus (USB) interface.

A method is also contemplated that in one embodiment may include executing an application on a server, a user interacting with the application via a stateless client, and the user accessing a storage device via the server, where the storage device is locally coupled to the stateless client.

Figure 1:
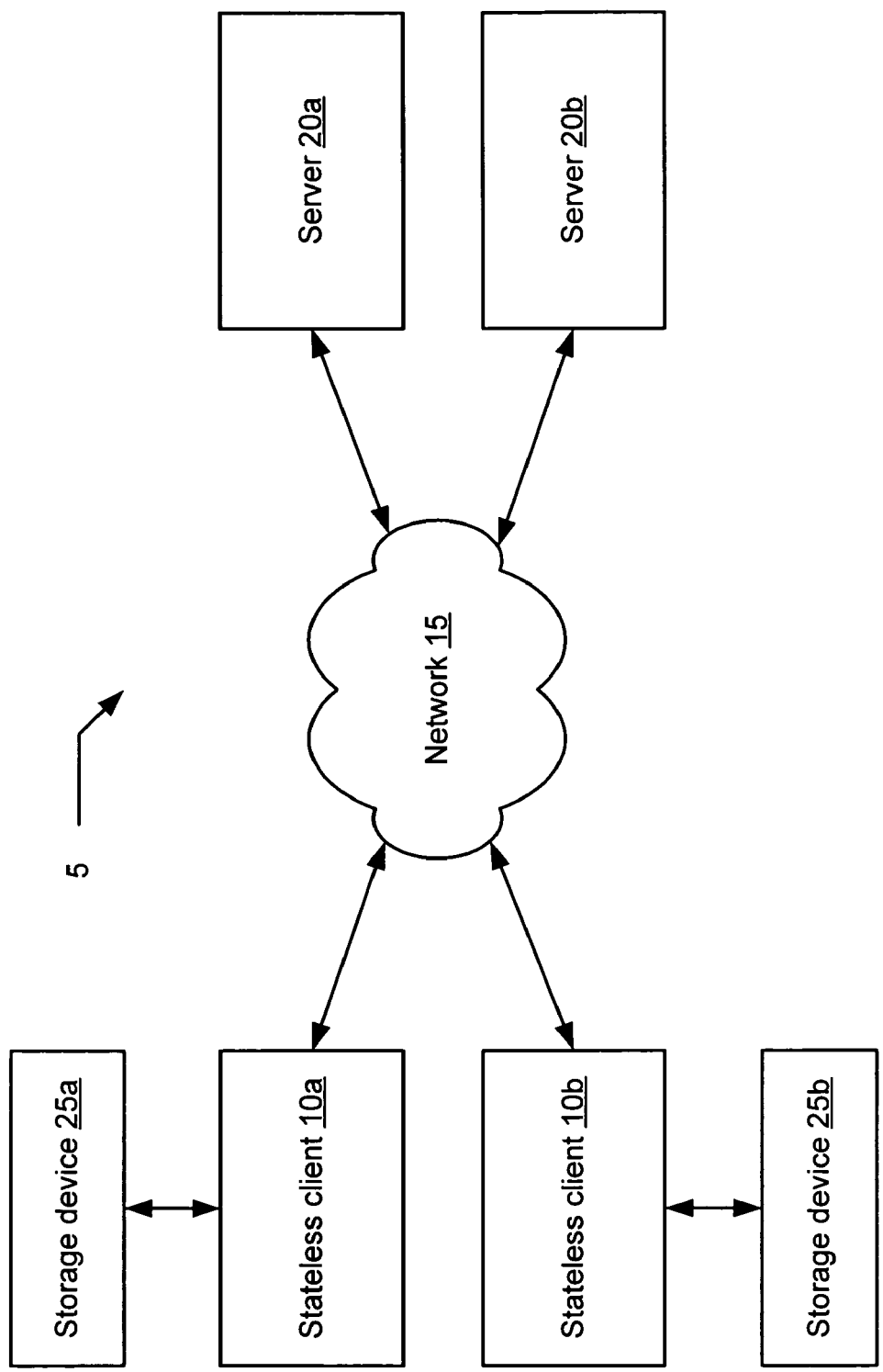
FIG. 1 is a block diagram illustrating one embodiment of a stateless-client/server system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Stateless-Client/Server System Architecture

Turning now to FIG. 1, a block diagram illustrating one embodiment of a stateless-client/server system is shown. In the illustrated embodiment, system 5 includes a plurality of stateless clients 10a and 10b configured to communicate with a plurality of server systems 20a and 20b via a network 15. Additionally, in the illustrated embodiment, each of stateless clients 10a and 10b is locally coupled to a respective one of storage devices 25a and 25b. It is noted that like reference numbers refer to like elements herein, and that a plurality of like elements distinguished by a letter suffix may be referred to generically in the plural or singular by a reference number without a letter suffix. For example, it is contemplated that in various embodiments, an arbitrary number of stateless clients 10, server systems 20, and storage devices 25 may be employed.

Stateless clients 10, which may also be referred to as ultra-thin stateless clients, may be configured to allow users to interact with various applications that execute on one or more of servers 20. As described in greater detail below in conjunction with the description of FIG. 2, in some embodiments stateless clients 10 may include hardware to support a user interface, such as interface hardware to drive input and output devices such as keyboards and video display devices, for example. Such embodiments may further include hardware to support interfaces to network 15 and storage devices 25. However, such embodiments of stateless clients 10 may lack an operating system and may not locally execute applications or locally store application data accessible by users. That is, application execution and data storage may take place on servers 20 and/or storage devices 25, whereas the hardware resources of stateless clients 10 may be configured to convey data and commands to and from servers 20 and/or storage devices 25 on behalf of one or more users. Since such embodiments of stateless clients 10 lack resources for locally executing application or operating system software or storing application data or "state," they may be referred to as "stateless." One example of a stateless client 10 is given by the Sun Ray family of ultra-thin client systems available from Sun Microsystems, Inc., although other embodiments of stateless clients are possible and contemplated.

In contrast to stateless clients 10, in the illustrated embodiment, servers 20 may include resources for execution of applications and operating system software as well as data storage. As described in greater detail below in conjunction with the description of FIG. 8, in various embodiments servers 20 may include one or more microprocessors as well as system memory and storage devices such as hard disk drives, for example. Servers 20 may in various embodiments be configured to execute one or more operating systems, such as Sun's Solaris operating system, Linux, Microsoft Windows, or any suitable operating system. Additionally, servers 20 may in various embodiments be configured to execute one or more user applications. For example, servers 20 may execute web browser applications, database applications, office productivity applications, multimedia applications, or any other suitable type of application software.

It is also contemplated that in some embodiments, one or more instances of servers 20 may be configured as a storage server. For example, in one embodiment server 20b may be configured as a network attached storage (NAS) server comprising storage devices such as arrays of disk drives. In such an embodiment, server 20b may be configured to provide storage for application data for use by applications executing on other servers 20. In some embodiments, storage servers may be employed in system architectures in which application execution resources are segregated from data storage resources.

Stateless clients 10 may be configured to communicate with servers 20 via network 15. In one embodiment, network 15 may be a local area network (LAN), such as an Ethernet network, for example, and may employ wired and/or wireless networking protocols. In other embodiments, one or more of stateless clients 10 and servers 20 may be geographically distant, such as in different buildings or cities. In such embodiments, network 15 may include wide-area networking functionality employing telecommunications-based network protocols. For example, network 15 may include a T1 or T3 interconnect, or a high-bandwidth optical interconnect.

Generally speaking, a given stateless client 10 may provide a user with input and output access to applications executing on one or more of servers 20. In some instances, a user may wish to provide input to or receive output from an application via a storage medium not otherwise accessible within system 5. For example, a user may have files stored on a portable hard drive or a removable storage medium such as a floppy or ZIP disk, CD-ROM/DVD-ROM, Flash-based keychain device, or another similar storage device. The user may wish to access these files for reading or writing from within some application executing on a server 20.

In the illustrated embodiment, stateless clients 10 are locally coupled to storage devices 25. Storage devices 25 may be any suitable type or format of storage device. In one embodiment, storage device 25 may be a mass storage device employing magnetic media, such as a portable hard drive or a removable-medium floppy, ZIP disk, or cartridge-based drive, or any other type of magnetic media-based storage device. In another embodiment, storage device 25 may be a mass storage device employing optical media, such as read-only or writable/rewritable CDs or DVDs, according to any of the various standards and formats for such media. In yet another embodiment, storage device 25 may be a solid-state mass storage device employing any of various solid-state memory technologies such as volatile, battery-backed random access memory (RAM), or nonvolatile read-only memory (ROM) or Flash memory, for example. In some embodiments, a storage device 25 may be directly coupled to a given stateless client 10 via an interface such as Universal Serial Bus (USB), Firewire/IEEE 1394, or any suitable peripheral interconnect interface. In other embodiments, a storage device 25 may be coupled to a given stateless client 10 through another peripheral. For example, a memory card may be coupled to a stateless client 10 through a USB-attached card reader into which the memory card may be inserted.

As noted above, in the illustrated embodiment, stateless clients 10 may have no resident operating system or internal user-accessible data storage. As described in greater detail below, a storage device 25 may be locally coupled to a given stateless client 10, but may be accessible to a user of given stateless client 10 via a given one of servers 20, such that the user may manipulate content of the storage device 25 via an application executing on given server 20.

Hardware Architecture of an Exemplary Stateless Client

Figure 2:
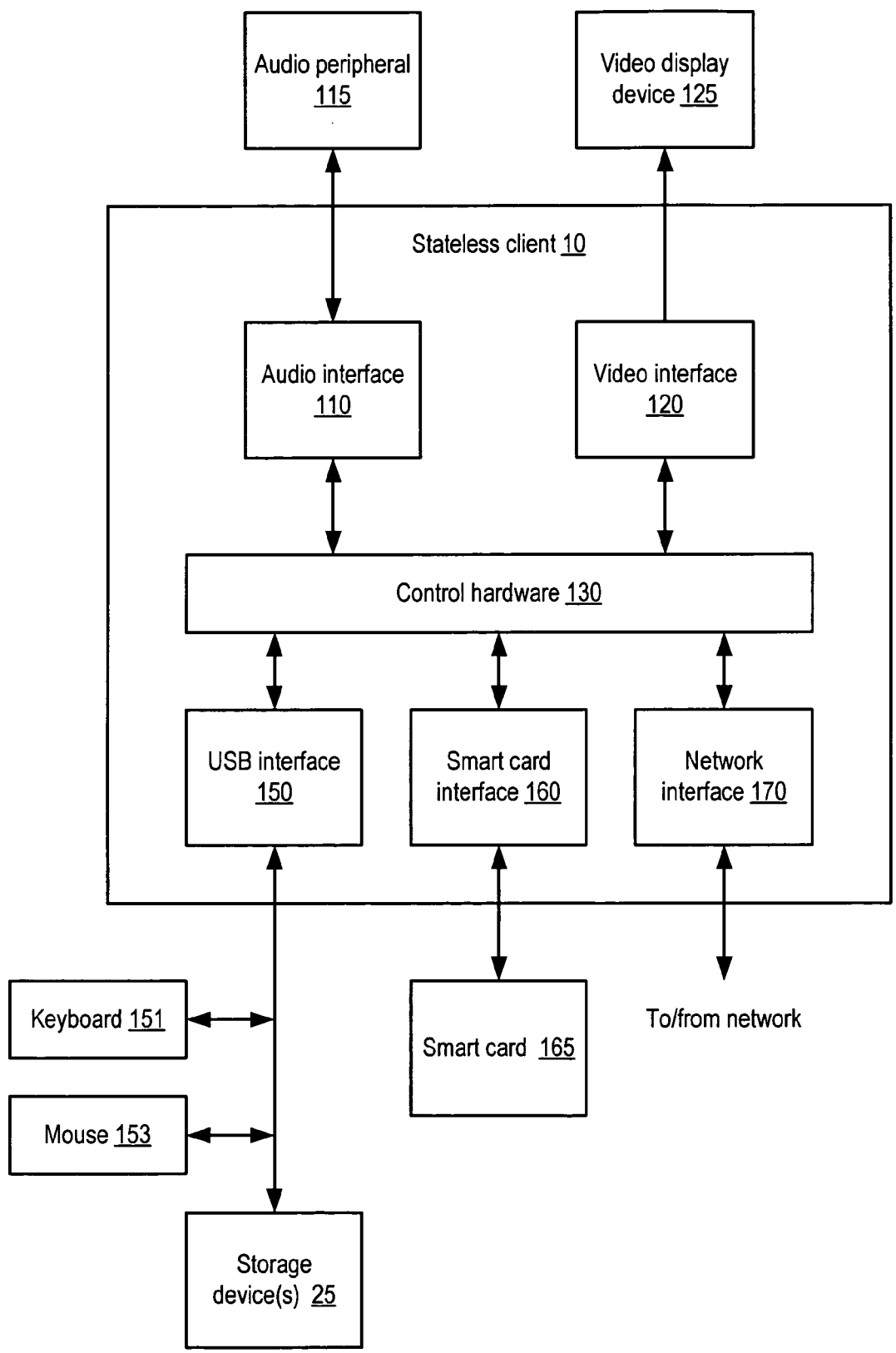
FIG. 2 is a block diagram illustrating one embodiment of a stateless client.

One exemplary embodiment of a stateless client 10 is illustrated in FIG. 2. In the illustrated embodiment, stateless client 10 includes an audio interface 110, a video interface 120, a USB interface 150, a smart card interface 160, and a network interface 170, each coupled to control hardware 130. Additionally, stateless client 10 is shown coupled to a number of devices via its several interfaces. Specifically, audio interface 110 is coupled to an audio peripheral 115, and video interface 120 is coupled to a video display device 125. USB interface is coupled to a keyboard 151, a mouse 153, and one or more storage devices 25. Smart card interface 160 is coupled to a smart card 165, and network interface 170 is coupled to a network such as network 15 of FIG. 1.

Audio peripherals 115 may in various embodiments include any type of audio input or output device, or multiple such devices, such as speakers, headphones, microphones, external amplifiers, or recording devices, for example. Audio interface 110 may be any suitable interface for driving audio output devices and/or receiving input from audio input devices. For example, in one embodiment audio interface 110 may include digital-to-analog (D/A) conversion logic to convert digital audio data received from one of the other interfaces (for example, from an application executing on a server 20 via network 15 and network interface 170) to analog signals suitable for driving audio output devices. In some embodiments, audio interface logic may also include analog-to-digital (A/D) conversion logic to convert analog signals received into digital data that may be conveyed to another device or an application on a server via another of stateless client 10's interface. In various embodiments, audio interface 110 may include amplification circuitry for driving unamplified output devices, or may include additional audio processing logic such as multichannel audio output mixing, audio synthesis, or digital audio effects processing, for example.

Video display device 125 may in various embodiments include any suitable video display device, such as a cathode-ray tube (CRT) monitor or a liquid-crystal display (LCD) monitor. In some embodiments, it is contemplated that video display device 125 may be built into the same chassis as stateless client 10, while in other embodiments video display device 125 may be separate from and coupled to stateless client 10, such as through a video cable. Video interface 120 may include logic configured to convert video data received from one of the other interfaces (for example, from an application executing on a server 20 via network 15 and network interface 170) to analog or digital signals in a format suitable for driving the attached video display device 125. In some embodiments, video interface 120 may support multiple different types of video display devices 125 or may support driving multiple such devices simultaneously. In one embodiment, video interface 120 may include frame buffer and display driver logic, while complex rendering tasks are performed in software on a server 20.

USB interface 150 may include logic configured to support transferring data to and from various USB-compliant peripheral devices according to one or more versions of the USB interface standard, such as USB 1.1 or USB 2.0, for example. USB interface 150 may include support for multiple physical USB interface ports within stateless client 10; in an alternative embodiment, an external USB hub (not shown) may be attached to increase the number of USB ports available for attaching devices. It is contemplated that in some embodiments of stateless client 10, a different peripheral interface for devices may be provided instead of or in addition to USB interface 150. For example, in one alternative embodiment, stateless client 10 may implement a Firewire/IEEE 1394 interface configured for coupling to peripherals such as storage devices 25. In various embodiments, storage devices 25 may be any of the types of storage devices described above in conjunction with the description of FIG. 1.

Keyboard 151 and mouse 153 may be any suitable variants of textual input and pointing devices. Mouse 153 may include touchpad devices or joysticks in various embodiments. In some embodiments, keyboard 151 and mouse 153 may be combined in the same chassis. In one embodiment of stateless client 10, a dedicated interface such as a PS/2 or serial interface (not shown) separate from USB interface 150 may be used to couple keyboard 151 and/or mouse 153.

In the illustrated embodiment, smart card interface 160 may be configured to allow a user to couple a smart card 165 to stateless client 10. In some embodiments, smart card 165 may be used to authenticate a user and allow the user to access applications executing on a server 20. For example, smart card 165 may include a secret code or biometric information that uniquely identifies a given user, such that a user may not need to provide other identifying or authenticating information to begin or continue using a given stateless client 10 to access applications. It is contemplated that in some embodiments of stateless client 10, smart card interface 160 may be omitted, and users may use conventional combinations of usernames and passwords entered, e.g., via keyboard 151, for authentication.

Network interface 170 may in various embodiments be configured to process various networking protocol layers (such as those defined by the Open Systems Interconnect (OSI) layered networking model, for example) to allow data sent to or from stateless client 10 via network 15 to be appropriately encapsulated or extracted. For example, network interface 170 may include logic configured to send and receive signals in the physical network layer, such as electrical signals transmitted via coaxial or twisted-pair electrical cable, optical signals transmitted via fiber-optic cable, or wireless radio signals. Network interface 170 may further be configured to perform error detection on received signals, decode network packets to determine whether they are destined for a given stateless client 10, and/or other networking functions. In the illustrated embodiment, network interface 170 may be configured to send or receive data from any of the other interfaces of stateless client 170. In various embodiments, network interface 170 may implement support for one or more different types of network infrastructure, such as wired Ethernet, Fibre Channel, Token-Ring, or wireless protocols such as IEEE 802.11 (Wi-Fi), for example.

Control hardware 130 may be configured to coordinate data exchange among the various other components within stateless client 10. For example, in one embodiment control hardware 130 may include an embedded microprocessor and a firmware program used by the microprocessor to control data flow within stateless client 10. In some embodiments, the various interfaces of stateless client 10 may be implemented according to a bus interface standard such as the Peripheral Component Interconnect (PCI) bus standard. In such embodiments, control hardware 130 may include logic configured to manage data buses, including arbitrating conflicts among devices, allocating device bandwidth through flow control, etc. It is noted that in the illustrated embodiment, the operation of control hardware 130 may be transparent to a user of stateless client 10; that is, a user may not be able to interact directly with control hardware 130 or any buffers or resources it employs in managing the hardware of stateless client 10.

Storage Device Organization and Management

Figure 3:
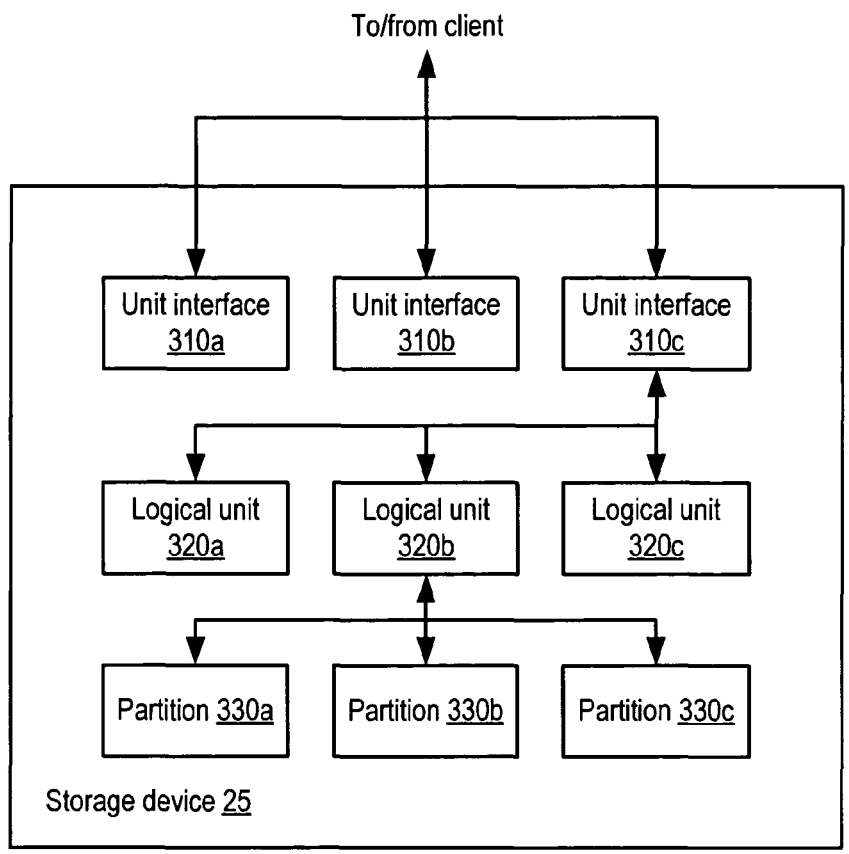
FIG. 3 is a block diagram illustrating one embodiment of a storage device configured to implement a logical hierarchy.

In some embodiments, storage devices 25 may implement an organizational hierarchy through which various elements or portions of the storage device may be defined and accessed. FIG. 3 illustrates one embodiment of a storage device 25 configured to implement a logical hierarchy. In the illustrated embodiment, storage devices 25 includes a plurality of unit interfaces 310a-c, which may be configured to couple to stateless client 10 through USB interface 150, for example. A plurality of logical units (LUNs) 320a-c are accessible through unit interface 310c, and LUN 320b includes a plurality of partitions 330a-c. It is contemplated that in other embodiments storage devices 25 may implement arbitrary numbers and organizations of unit interfaces 310, LUNs 320, and partitions 330.

Unit interfaces 310 may be configured to allow access to different types of functionality within a given storage device

25. For example, in one embodiment a storage device 25 configured as a portable MP3 player may include audio playback capability in addition to data storage capability. In such an embodiment, a particular unit interface 310*a* may be defined for accessing audio capabilities of this storage device 25, while another unit interface 310*c* may be defined for accessing stored data files themselves. In some embodiments, storage device 25 may implement a single unit interface 310.

In some embodiments, storage device 25 may implement several distinct devices. For example, a given storage device 25 may be configured as a multiformat memory card reader, and may include multiple slots configured to accept different types of memory cards such as Compact Flash (CF) cards, Secure Digital (SD) cards, Memory Stick cards, and/or other types of cards. LUNs 320 may be configured to allow access to each distinct device implemented within storage device 25. For example, each of three card slots corresponding to the three memory card types just mentioned may correspond to a respective LUN 320*a-c*. In some embodiments of storage device 25, such as a portable hard drive embodiment employing a single hard disk, a single LUN 320 may be implemented.

Partitions 330 may be used in some embodiments to further subdivide a given LUN 320. In one embodiment, a partition 330 may be a software construct managed by an operating system or application, such as an application executing on a server 20, to facilitate organization of data. Such partitions may also be referred to as logical or virtual partitions. For example, a user may choose to organize a given storage device 25 into multiple logical partitions 330 according to different types of data to be stored. Later, the user may a particular partition 330 on which to perform some action, such as a backup operation. In some embodiments, a single partition 330 may be defined to represent the entirety of data stored on a given storage device 25.

Figure 4:
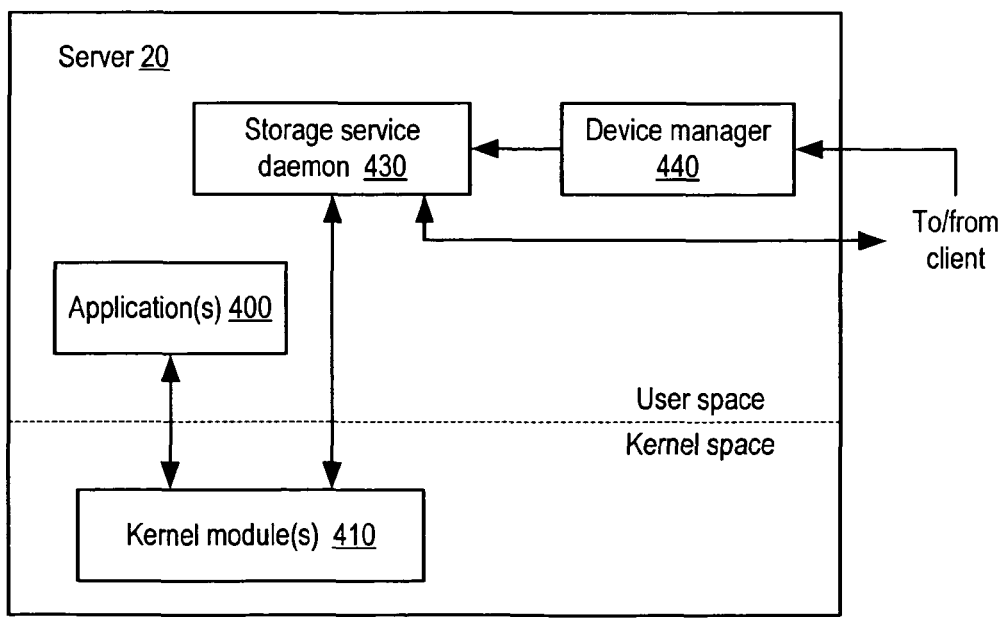
FIG. 4 is a block diagram illustrating one embodiment of a software system configured for management of storage devices locally coupled to stateless clients.

As previously noted, stateless clients 10 may lack operating systems or other local software. Thus, in some embodiments, storage devices 25 may be managed by software configured to execute on one or more of servers 20. One embodiment of a software system configured for management of storage devices locally coupled to stateless clients is illustrated in FIG. 4. In the illustrated embodiment, several software modules are executable by a given server 20. These modules include one or more applications 400, which are configured to interface with one or more kernel modules 410. In turn, kernel modules 410 are configured to interface with a storage service daemon 430. Storage service daemon 430 receives information from device manager 440, and both modules interact with storage devices 25 via network 15 and stateless clients 10 (shown in FIG. 1).

In the illustrated embodiment, server 20 is configured to provide a user execution mode as well as a kernel execution mode, which may also be referred to as user space and kernel space, respectively. Software executing in user execution mode may be less privileged than software executing in kernel execution mode. For example, operating system software may restrict the degree to which user space software may access system resources, such as system memory allocated to various software modules as well as data storage and communication resources. By limiting the degree to which user-space software modules may interact with one another (e.g., by providing each user-space module a protected memory region in which to execute) and by coordinating access to shared system resources through kernel-space software (e.g. by providing kernel-space entrypoints through which user-space software accesses such resources), an operating system may increase system stability and integrity. For example, limiting the privileges of user-space software may help prevent an errant application from corrupting other applications or system resources, which might otherwise result in data loss or system failure.

Applications 400 may be any software applications configured to access and manipulate data storage presented by storage devices 25. For example, in various embodiments applications 400 may be word processors or other office productivity applications, applications for generating or viewing web-based Internet content, databases, multimedia generation and/or presentation applications, or any other type of application. In the illustrated embodiment, applications 400 may be configured to access data stored on storage devices 25 for creation, deletion, reading, writing, or other operations via an application programming interface (API) presented by kernel modules 410. Such an API may include a set of function calls specific to the supported operations, for example. In the illustrated embodiment, applications 400 execute in user space.

Kernel modules 410 may be configured to present to applications 400 an interface to storage devices 25. For example, in one embodiment kernel modules 410 may include data structures that allow a given storage device 25 to appear to applications 400 as a block-type storage device capable of reading or writing data in blocks of a given size (e.g., 512 or 1024 bytes), or as a character-type or "raw" storage device capable of reading or writing data in variable quantities. In alternative embodiments, kernel modules 410 may present other types of device models instead of or in addition to block- and character-type devices. Kernel modules 410 may be additionally configured to provide a file system whereby such block or character storage device representations may be organized into a hierarchy of files, directories, and/or partitions.

In some embodiments, kernel modules 410 may be configured to provide applications 400 with common interfaces to any type of storage device regardless of whether that storage device is attached to a stateless client 10, is internal to a particular server 20, or is otherwise accessed via network 15, such as in the network-attached storage case described previously. In such embodiments, storage service daemon 430 may be configured to provide protocol and interfacing support specific to storage devices 25 locally coupled to stateless clients 10. More generally, storage service daemon 430 may serve to provide a software interface between applications 400 and storage devices 25.

For example, as described in greater detail below, in one embodiment storage service daemon 430 may be configured to establish control of each LUN 320 of the storage devices 25 attached to a particular stateless client 10, to receive requests for accessing a given LUN 320 from kernel modules 410, and to assemble commands for carrying out those accesses according to the specific access protocols implemented by various storage devices 25 (e.g., SCSI commands for hard disk type storage devices, MMC-2 commands for CD/DVD type devices, etc.). Also, in one embodiment storage service daemon 430 may be configured to establish control of each USB interface 150 implemented among the various stateless clients 10 interacting with a given server 20 and to execute the previously mentioned commands according to a USB protocol appropriate to each interface (e.g., bulk-only protocol for hard disks, control-bulk-interrupt (CBI) protocol for CD/DVD devices, etc.).

It is noted that in the illustrated embodiment, storage service daemon 430 is implemented within user space. In many conventional computer systems, the majority or entirety of software support for storage devices is implemented within kernel space. However, in many embodiments, kernel-space software is specific to a particular operating system platform, such as Unix or Windows. Thus, if kernel-level device support for different operating system platforms is desired, such support may need to be developed separately for each desired platform. Further, since kernel space software is typically more privileged than user space software, the burden of testing and validating kernel space software to ensure system stability and integrity may be greater than for user space software. For some embodiments, implementing storage service daemon 430 in user space may simplify development of the aforementioned storage services for a given platform, and may also simplify reuse and validation of the relevant code across different operating system platforms.

In the illustrated embodiment, device manager 440 may be configured to detect transitions in the availability of various storage devices 25 and to communicate such transitions to storage service daemon 430. More generally, device manager 440 may be configured to detect the presence of a given storage device 25 coupled to a given stateless client 10. For example, in some embodiments, storage devices 25 may be attached or detached from USB interface 150 of a given stateless client 10 at any time, which transitions may be referred to as "hotplugging events" of storage devices 25. Device manager 440 may be configured to detect hotplugging events corresponding to various storage devices 25, and may communicate such events to storage service daemon 430, which in one embodiment may responsively update its data structures to reflect the addition or deletion of available storage device 25. Storage service daemon 430 may in turn convey such events to kernel modules 410, which in one embodiment may responsively allocate or delete block-type or character-type storage devices corresponding to storage devices 25 and/or modify a file system to reflect such allocations or deletions.

Device manager 440 may in some embodiments be configured to collect additional information regarding storage devices 25 that appear or disappear during hotplugging events, such as the network address of the stateless client 10 corresponding to a given storage device 25, identification information corresponding to a given storage device 25 (such as a manufacturer or device ID, for example), and/or client-specific interface information (such as an input/output device address or interrupt channel, for example). Device manager 440 may also be configured to collect other or different information regarding storage devices 25 and may convey any such information to storage service daemon 430 along with notification of a hotplugging event. In some embodiments, it is contemplated that the functionality of device manager 440 may be incorporated within storage service daemon 430.

Figure 5:
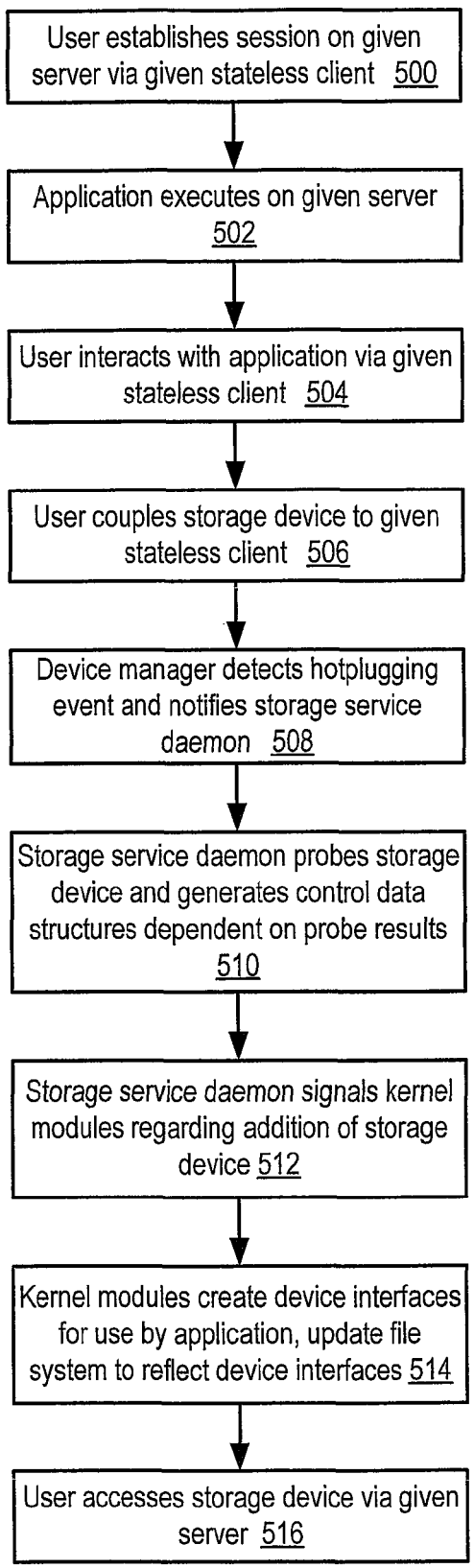
FIG. 5 is a flow diagram illustrating the operation of one embodiment of a stateless-client/server system configured to support user access to storage devices locally attached to a given stateless client.

FIG. 5 illustrates the operation of one embodiment of a stateless-client/server system configured to support user access to storage devices locally attached to a given stateless client. Referring collectively to FIG. 1 through FIG. 5, operation begins in block 500 where a user establishes a session on a given server 20 via a given stateless client 10. For example, the user may insert a smart card 165 into given stateless client 10, or may enter a username and password via keyboard 151 attached to stateless client 10.

Subsequent to the user establishing a session on given server 20, an application 400 may execute on given server 20 (block 502). For example, the user may invoke an application such as a web browser, word processor, or another type of application. In an alternative embodiment, application 400 may execute on given server 20 prior to the user establishing a session via given stateless client 10. For example, the user may have previously invoked application 400 via a different stateless client 10, discontinued using the different stateless client 10, and subsequently established communication with given server 20 from given stateless client 10. Application 400 may have continued to execute throughout this sequence, subsequent to its original invocation.

The user may then interact with application 400 via given stateless client 10 (block 504). For example, the user may enter text and control menus of application 400 via keyboard 151 and mouse 153. Control information generated by those peripherals may be conveyed to given server 20 over network 15, and server 20 may send graphical information back to given stateless client 10 via network 15 for display on video display device 125.

In one embodiment, the user may subsequently couple a storage device 25 to given stateless client 10 (block 506). For example, the user may attach a portable hard drive to USB interface 150. Device manager 440 may then detect the hotplugging event resulting from the coupling of storage device 25 to given stateless client 10 and may notify storage service daemon 430 of the hotplugging event (block 508). Storage service daemon 430 may responsively probe storage device 25, for example to determine the presence of unit interfaces 310 and LUNs 320, and may generate control data structures dependent on the probe results (block 510). Storage service daemon 430 may further signal kernel modules 410 regarding the addition of storage device 25 (block 512), and kernel modules 410 may responsively create block- and/or character-type device interfaces for use by application 400. Kernel modules 410 may additionally update a file system to reflect the created device interfaces (block 514).

Once a device interface is made available, the user may access storage device 25 via given server 20 (block 516). For example, the user may instruct application 400 to save a copy of a document in a file on the portable hard disk attached as storage device 25. Application 400 may responsively issue write requests to kernel modules 410. In Storage service daemon 430 may then assemble a write command pertinent to storage device 25 as described above, and may convey the command along with the data to be written to storage device 25 via network 15 and given stateless client 10.

Figure 6:
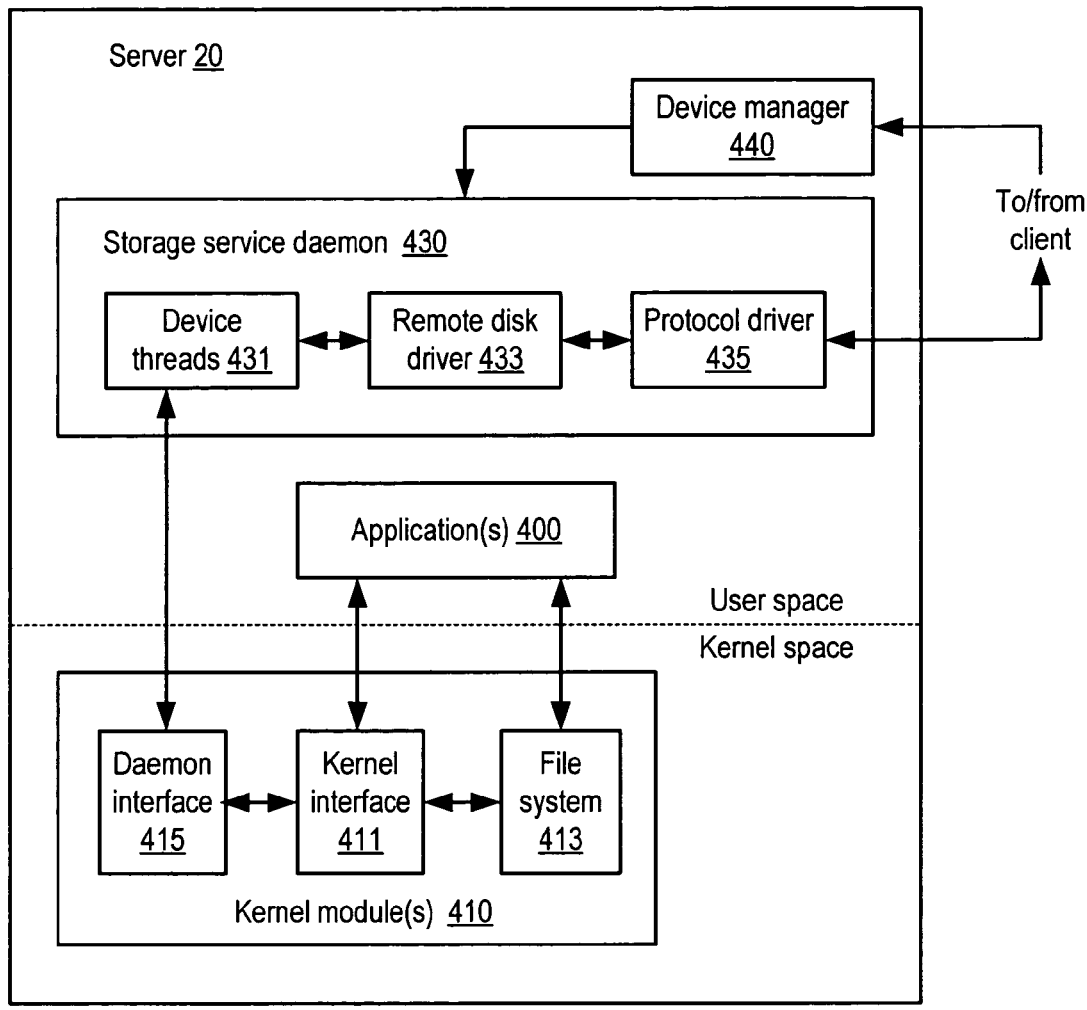
FIG. 6 is a block diagram illustrating another embodiment of a software system configured for management of storage devices locally coupled to stateless clients.

In some embodiments, the functionality of storage service daemon 430 and kernel modules 410 may be implemented by several discrete modules of code configured to perform separate functions. One such embodiment is illustrated in FIG. 6. In the illustrated embodiment, as in that shown in FIG. 4, several software modules are executable by a given server 20. Applications 400 and device manager 440 may be illustrative of those instances illustrated in FIG. 4 and described above. In the embodiment of FIG. 6, kernel modules 410 include kernel interface 411 and file system 413, each configured to interface with applications 400, as well as daemon interface 415 configured to interact with kernel interface 411. Storage service daemon 430 includes a plurality of device threads 431, a remote disk driver 433, and a protocol driver 435, each of which interfaces with the successive module. Device threads 431 are configured to interface with daemon interface 415, and protocol driver 435 is configured to interact with storage devices 25 via network 15 and stateless clients 10. It is noted that like the embodiment illustrated in FIG. 4 and described above, in the illustrated embodiment storage service daemon 430 is configured to operate in user space, whereas kernel modules 410 are configured to operate in kernel space.

As described previously, kernel modules 410 may collectively present a common set of storage device interfaces to applications 400. In the illustrated embodiment, kernel interface 411 may comprise the public interface for storage-related system calls. That is, kernel interface 411 may be configured to receive system calls pertaining to reading, writing, and configuration/status querying of block-type or character-type devices corresponding to storage devices 25. In some embodiments, one instance of kernel interface 411 may be instantiated for each logical partition 330 and/or each LUN 320 that exists within each storage device 25.

Some applications 400 may not reference block-type or character-type devices directly, but instead may reference files or directories maintained by a file system such as file system 413. In the illustrated embodiment, file system 413 may be configured to implement one or more file system types dependent on the operating system environment(s) supported by server 20. For example, file system 413 may implement a Unix/Linux-type file system, a Windows-type file system, or other types of file systems, and/or combinations of these. File system 413 may be configured to translate file references received from applications 400 into device references that may then be passed to kernel interface 411 as described above.

In the illustrated embodiment, daemon interface 415 is configured to convey device access requests from kernel interface 411 to storage service daemon 430. In some embodiments, one instance of daemon interface 415 may be instantiated for each LUN 320 that is mapped by storage service daemon 430. In some such embodiments, an additional instance of daemon interface 415 may also be configured to manage the allocation and deallocation of identifying state to storage devices 25 and their partitions 330 as storage devices 25 are attached and removed from various stateless clients 10. For example, in an embodiment implementing a Unix-type operating system environment, daemon interface 415 may be configured to allocate device minor numbers to partitions 330 when a hotplugging event resulting from attachment of a particular storage device 25 is detected. Similarly, daemon interface 415 may place corresponding minor numbers on a free list when a hotplugging event resulting from detaching a particular storage device 25 is detected.

Additionally, in some embodiments device access requests may not be able to be serviced as quickly as they may be generated by applications 400. For example, in some embodiments where USB peripherals are used, one transaction to a given unit interface 310 may need to complete before another transaction to that unit interface 310 may be issued. In some such embodiments, daemon interface 415 may maintain queuing data structures that may be configured to store pending access requests received from kernel interface 411 before those requests are serviced by storage service daemon 430. It is contemplated that in other embodiments, such queuing data structures may alternatively be maintained within storage service daemon 430, or that both daemon interface 415 and storage service daemon 430 may include support for queuing.

Since the public storage interface presented to applications 400 is provided through kernel interface 411, the interface between daemon interface 415 and storage service daemon 430 may remain private with respect to applications 400, which in some embodiments may simplify the implementation and maintenance of kernel modules 410. For example, in such an embodiment the interface between storage service daemon 430 and kernel modules 410 may be modified or tuned without disturbing the interface presented to applications 400. However, in an alternative embodiment, it is contemplated that daemon interface 415 and kernel interface 411 may be implemented in a single module.

Within storage service daemon 430, data transfers to and from storage devices 25 may be managed by device threads 431. In the illustrated embodiment, an individual device thread 431 may be created corresponding to unit interface 310 and each LUN 320 when a new storage device 25 is detected via a hotplugging event, as described in greater detail below in conjunction with the description of FIG. 7. In embodiments where an instance of daemon interface 415 is also provided for each LUN 320, there may be a one-to-one correspondence between daemon interface 415 and the LUN device threads 431. As noted above, in some embodiments each device thread 431 may implement one or more queuing data structures in which access requests destined for a corresponding unit interface 310 or LUN 320 may reside while waiting to be serviced.

In one embodiment, each device thread 431 may be separately schedulable for execution by server 20. For example, server 20 may be configured to implement a multithreaded execution environment. In such an environment, individual executable processes may spawn related executable threads that may share the resources of the parent process, thereby reducing context switch overhead when switching between such threads. In some embodiments, allocating individual device threads 431 per LUN 320 and/or unit interface 310 may improve server 20's ability to schedule and allocate resources. However, it is contemplated that in some embodiments, control of all LUNs 320 and/or unit interfaces 310 may be implemented within a single schedulable thread or process, or may be apportioned among threads or process in other than a one-to-one ratio.

Different storage devices 25 may define different protocols for data access, depending on the device type. Remote disk driver 433 may be configured to implement specific access protocols or "command sets" implemented by various storage devices 25, and to assemble commands according to those protocols upon receiving an access request from a particular device thread 431. Some exemplary command sets that may be supported by remote disk driver 433 and their corresponding types of storage devices include: SCSI (some hard disk devices), QIC-157 (tape storage devices), SFF 8070i and UFI (floppy and/or ZIP-type drives), ATAPI/MMC-2 (CD/DVD-type devices), and RBC (Flash memory-type devices). It is contemplated that remote disk driver 433 may support various combinations of these command sets as well as others not listed here.

Additionally, different USB protocols may be defined for different types of storage devices 25. In the illustrated embodiment, protocol driver 435 may be configured to assemble data access commands provided by remote disk driver 433 into USB transactions according to the relevant protocol for the storage device 25. For example, protocol driver 435 may select a bulk-only protocol for hard disks, or a control-bulk-interrupt (CBI) protocol for CD/DVD devices. As noted above, in some embodiments it is contemplated that stateless clients 10 may implement another peripheral interface instead of or in addition to USB, such as a Firewire/IEEE 1394 interface, for example. In such embodiments, protocol driver 435 may be configured to assemble commands received from remote disk driver 433 into transactions appropriate to the targeted storage device 25 according to the implemented peripheral interface.

Figure 7:
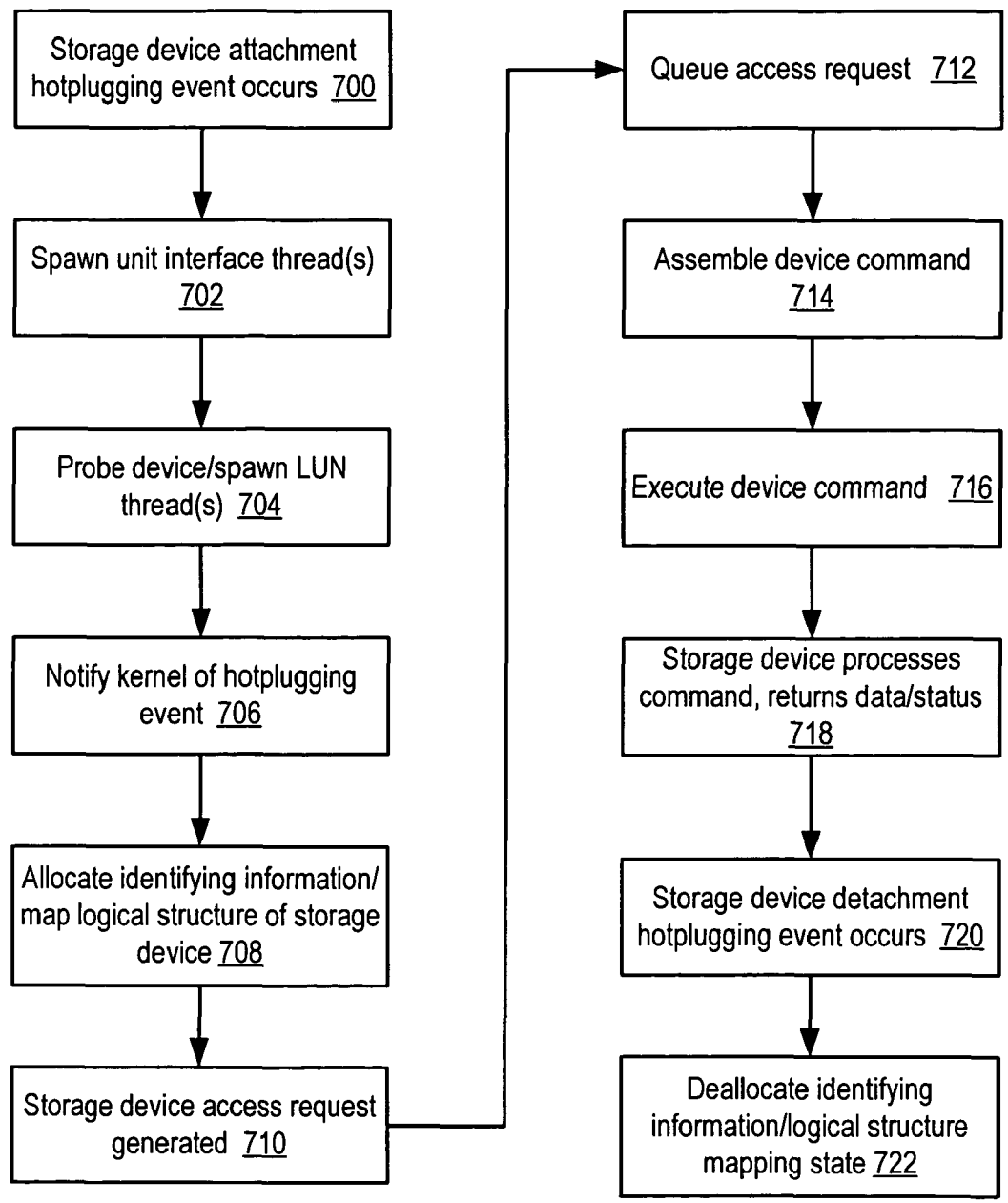
FIG. 7 is a flow diagram illustrating the operation of another embodiment of a stateless-client/server system configured to support user access to storage devices locally attached to a given stateless client.

FIG. 7 illustrates one embodiment of operation of the software illustrated in FIG. 6 within one embodiment of a stateless-client/server system configured to support user access to storage devices locally attached to a given stateless client. Referring collectively to FIG. 1 through FIG. 3, FIG. 6, and FIG. 7, operation begins in block 700 where a hotplugging event corresponding to attachment of a storage device 25 occurs. For example, in one embodiment a storage device 25 may be attached to a given stateless client 10, which may in turn convey the presence of storage device 25 to server 20, where device manager 440 may detect the hotplugging event and convey the event to storage service daemon 430.

Subsequent to the hotplugging event, one or more unit interface threads may be spawned corresponding to the unit interface(s) present within hotplugged storage device 25 (block 702). For example, in one embodiment device threads 431 may instantiate one thread per unit interface 310, although in other embodiments other correspondences between device threads 431 and unit interfaces 310 are possible and contemplated.

Unit interface threads may then probe their respective devices within storage device 25 and spawn one or more additional threads corresponding to the logical unit(s) present within hotplugged storage device 25 (block 704). In one embodiment, for example, device threads 431 may instantiate one thread per LUN 320, although in other embodiments other correspondences between device threads 431 and LUNs 320 are possible and contemplated.

Once threads corresponding to the logical structure of hotplugged storage device 25 have been instantiated, kernel modules 410 may be notified of the hotplugging event (block 706). For example, in one embodiment device threads 431 may notify a master controller instance of daemon interface 415 of the hotplugging event. Responsively, identifying information corresponding to the logical structure of hotplugged storage device 25 may be allocated and the structure mapped for access by software (block 708). In one embodiment, daemon interface 415 may be configured to allocate minor numbers to each partition 330 and LUN 320 detected within hotplugged storage device 25. Additionally, in various embodiments, daemon interface 415 or device threads 431 may create device nodes such as character-type or block-type device nodes corresponding to each LUN 320 and/or each partition 330, which device nodes may facilitate access to storage device 25 by, e.g., applications 400.

Once the logical structure of hotplugged storage device 25 has been identified and mapped, a request to access the storage device may occur (block 710). In one embodiment, an application 400 may request to access a file stored within hotplugged storage device 25, or may request to access hotplugged storage device 25 directly as a character or block-type device. In such embodiments, application 400 may pass its request to file system 413 or directly to kernel interface 411, such as through an API.

The access request may then be queued (block 712). For example, in one embodiment the access request may be queued within daemon interface 415, while in another embodiment it may be conveyed directly to storage service daemon 430 and queued within a corresponding one of device threads 431. In some embodiments, additional processing of the access request may occur before queuing. In one such embodiment the size of the request may be calculated and adjusted or translated to correspond to a block size employed by hotplugged storage device 25, for example in a system where the block size used by software differs from the block size used by a given physical storage device 25.

A device command may subsequently be assembled for a given queued access request (block 714). For example, a given device thread 431 may retrieve a queued access request corresponding to its LUN 320 and may pass the request to remote disk driver 433, which may in turn assemble a device command according to a protocol defined for hotplugged storage device 25, as described previously. The assembled command may then be executed (block 716). In the illustrated embodiment, protocol driver 435 may execute the assembled command according to a protocol specific to the peripheral interface through which hotplugged storage device 25 is coupled to corresponding stateless client 10. For example, protocol driver 435 may execute the command according to a particular USB mass storage device protocol as described above.

Hotplugged storage device 25 may receive such commands via network 15 and stateless client 10 and may process them, returning data and/or processing status (block 718). For example, hotplugged storage device 25 may a read access request or a write access request along with data to be written, or another type of request such as a status or information request. Hotplugged storage device 25 may then retrieve or store the relevant information, and return an indication to storage service daemon 430 of the status of the operation as well as any data requested, if available.

At any time subsequent to being attached to stateless client 10, hotplugged storage device 25 may be detached, and a corresponding hotplugging event may be detected by device manager 440 (block 720). Device manager 440 may in turn notify storage service daemon 430 of the hotplugging event. Responsively, allocated identifying and/or mapping state may be deallocated (block 722). For example, in one embodiment device threads 431 corresponding to detached storage device 25 may be deallocated. In some embodiments, a given storage device 25 may be detached while one or more applications 400 have open references to data structures in its partitions 330. In some such embodiments, daemon interface 415 may leave allocated identification resources associated with such partitions (such as minor numbers or other state), but may mark such resources as stale, such that the identification resources may still be referenced by applications 400 but may reflect the absence of the underlying partitions 330. For example, an error condition may be returned to an application 400 that attempts an access request to a partition 330 with stale status. Daemon interface 415 may be configured to deallocate the resources corresponding to a stale partition 330 when the last application 400 maintaining an open reference to the stale partition closes it.

It is noted that in some embodiments, multiple access requests may occur between the time a given storage device 25 is attached and detached from a corresponding stateless client 10. Alternatively, in some instances no access requests may occur during this time. Corresponding variations in the operation illustrated in FIG. 7 are possible and contemplated.

Exemplary Server System Embodiment

Figure 8:
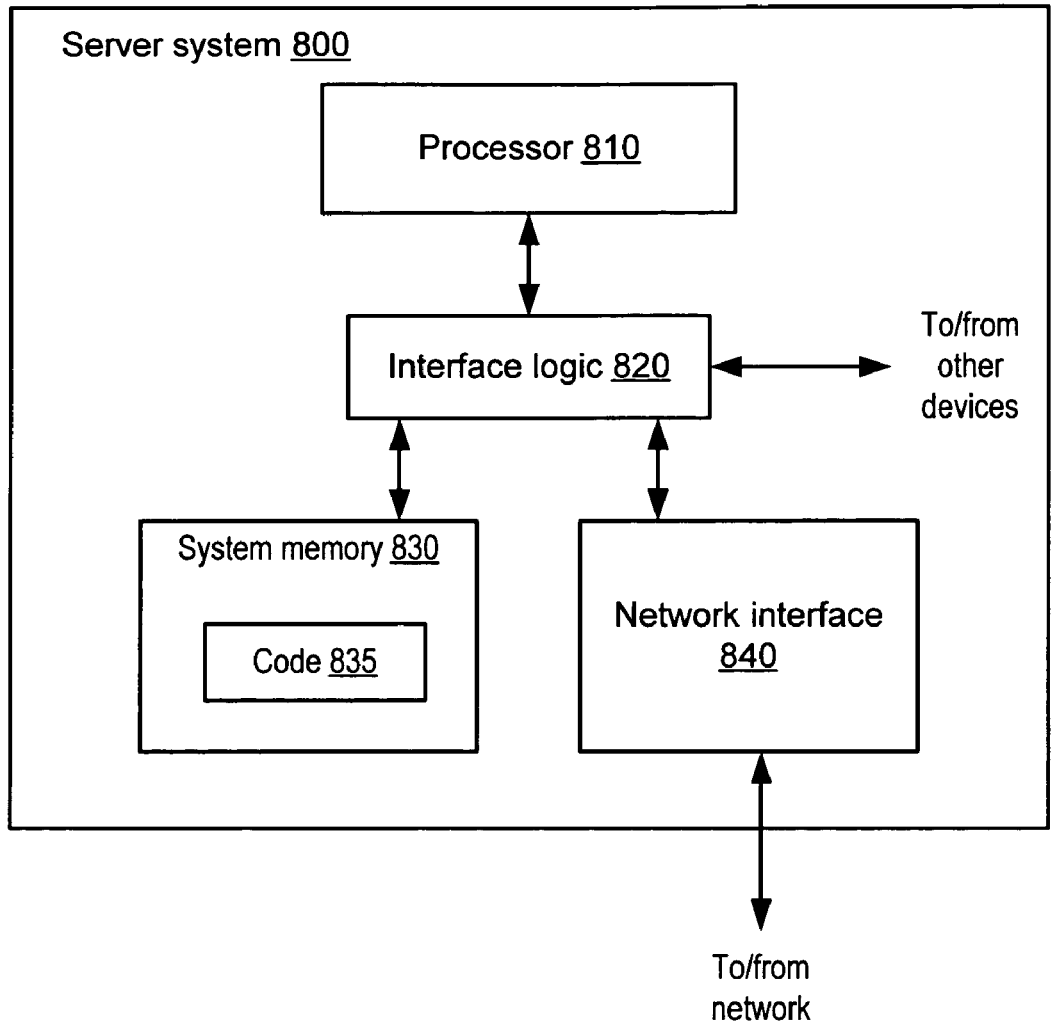
FIG. 8 is a block diagram illustrating one embodiment of a server computer system.

As shown in FIG. 4 and FIG. 6, server 20 may be configured to execute one or more software modules. One exemplary embodiment of a server computer system is illustrated in FIG. 8. In the illustrated embodiment, server system 800 includes a processor 810 coupled to a system memory 830 via interface logic 820. Interface logic 820 is coupled to a network interface 840 and may couple to additional devices.

Processor 810 may be any type of processor. In some embodiments, processor 810 may be a general-purpose microprocessor that implements one or more instruction set architectures such as SPARC, x86, Power/PowerPC, or any other suitable architecture or variant thereof. In other embodiments, processor 810 may be an embedded processor, a digital signal processor, or another processor capable of executing instructions. In the illustrated embodiment, processor 810 may be configured to access system memory 830 or another device to store and retrieve program instructions and data.

Interface logic 820 may be configured as bridge logic. In some embodiments, interface logic 820 may function as a "north bridge" coupling processor 810 and system memory 830, and may be configured to translate memory access requests originating from processor 810 to the appropriate format for system memory 830 and vice versa. In such an embodiment, interface logic 820 may also be configured for coupling to other peripheral buses to which peripheral devices may be attached, such as graphics adapters, storage devices, network interfaces, and other such devices. In some embodiments, interface logic 820 may couple to a "south bridge" interface circuit (not shown), which may be configured for coupling to additional peripheral devices such as pointing devices, keyboards, etc. In other embodiments, interface logic 820 may incorporate all peripheral interface logic in addition to providing a memory interface. It is contemplated that in some embodiments, all or part of interface logic 820 may be incorporated into processor 810.

Network interface 840 may be any interface suitable for coupling server system 800 to a network such as network 15 of FIG. 1, for example. In various embodiments, network interface 840 may be adapted to couple server system 800 to wired networks employing electrical or optical cable, to wireless networks, or to a combination thereof. Network interface 840 may in one embodiment support a networking protocol standard such as Ethernet, while in other embodiments it may support other protocols or combinations or protocols such as Token-Ring, Fiber/Copper Distributed Data Interface (F/CDDI), Fibre Channel, or any other suitable protocol.

System memory 830 may include any of various types of memory technologies, or combinations thereof. In some embodiments, system memory 830 may be largely comprised of some variant of synchronous dynamic RAM (SDRAM), but in other embodiments static RAM (SRAM) or another RAM technology may be used. In some embodiments, system memory 830 may include additional resources for error detection and/or correction, such as parity bits or error correcting code (ECC) bits, which may be separate from resources dedicated to storage of data or instructions.

In some embodiments, system memory 830 may be one embodiment of a computer-accessible medium configured to store program instructions executable by processor 810 as well as data accessible by processor 810. The program instructions and data may comprise any software program, module or application, such as any of the software modules illustrated in FIG. 4 or FIG. 6, for example. Such program instructions and data are illustrated as code 835 within system memory 830 in the illustrated embodiment. However, in other embodiments, program instructions and/or data may be received, sent or stored upon different types of computer-accessible media. Generally speaking, a computer-accessible medium may include storage media or memory media such as magnetic or optical media, e.g., disk or CD-ROM, such as may be coupled to server system 800 through interface logic 820, for example. A computer-accessible medium may also include volatile or non-volatile media such as RAM (e.g. SDRAM, DDR SDRAM, RDRAM, SRAM, etc.), ROM, etc, such as may be included within system memory 830. Further, a computer-accessible medium may include transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A system, comprising:
a memory; and
a processor of a server coupled to the memory and configured to execute instructions to:
detect the presence of a mass storage device locally coupled to a stateless client; and
interface said mass storage device to an application executable on the server, wherein the server is configured to implement a multithreaded execution environment, wherein to interface the mass storage device to the application, the processor is further configured to execute the instructions to implement a device interface through which the mass storage device is visible to the application, and wherein the device interface is implemented by a corresponding device thread that is separately schedulable from other device threads for execution by the server;
wherein said mass storage device is accessible via said server by a user who interacts with said application via said stateless client; and
wherein the processor is further configured to execute the instructions to store data to said mass storage device via said stateless client in response to said user's interaction with said application.

2. The system as recited in claim 1, wherein said mass storage device is locally coupled to said stateless client via a Universal Serial Bus (USB) or IEEE 1394 interface.

3. The system as recited in claim 1, wherein said mass storage device employs magnetic media, optical media, or solid-state storage media.

4. The system as recited in claim 1, wherein the server is configured to detect a hotplugging event generated in response to disconnection of the mass storage device from the stateless client.

5. The system as recited in claim 4, wherein in response to detecting the hotplugging event, the server is configured to mark resources associated with the mass storage device as deleted or stale, such that disconnection of the mass storage device is visible to the application.

6. The system as recited in claim 1, wherein said server is further configured to provide a kernel execution mode and a user execution mode, and wherein said server is further configured to execute a storage service daemon, wherein said storage service daemon executes in user execution mode.

7. The system as recited in claim 1, wherein said mass storage device comprises one or more unit interfaces, wherein each unit interface comprises one or more logical units (LUNs), and wherein each logical unit comprises one or more partitions.

8. A method, comprising:
detecting the presence of a mass storage device locally coupled to a stateless client;
interfacing said mass storage device to an application executable on a server, wherein the server is configured to implement a multithreaded execution environment, wherein the server is configured to implement a device interface through which the mass storage device is visible to the application, and wherein the device interface is implemented by a corresponding device thread that is separately schedulable from other device threads for execution by the server;
wherein said mass storage device is accessible via said server by a user who interacts with said application via said stateless client,
storing data to said mass storage device via said stateless client in response to said user interacting with said application.

9. The method as recited in claim 8, wherein said mass storage device is locally coupled to said stateless client via a Universal Serial Bus (USB) or IEEE 1394 interface.

10. The method as recited in claim 8, wherein said mass storage device employs magnetic media, optical media, or solid-state storage media.

11. The method as recited in claim 8, further comprising disconnecting the mass storage device from the stateless client.

12. The method as recited in claim 11, further comprising indicating a hotplugging event to the server in response to disconnection of the mass storage device, wherein upon processing of the hotplugging event by the server, disconnection of the mass storage device is visible to the application.

13. The method as recited in claim 8, wherein said server is further configured to provide a kernel execution mode and a user execution mode, and wherein said server is further configured to execute a storage service daemon, wherein said storage service daemon executes in user execution mode.

14. The method as recited in claim 8, wherein said mass storage device comprises one or more unit interfaces, wherein each unit interface comprises one or more logical units (LUNs), and wherein each logical unit comprises one or more partitions.

15. A computer-accessible storage medium that stores program instructions, wherein the program instructions are executable by a server to:
   detect the presence of a mass storage device locally coupled to a stateless client; and
   interface said mass storage device to an application executable on said server, wherein the server is configured to implement a multithreaded execution environment, and wherein to interface the mass storage device to the application, the program instructions are executable by the server to implement a device interface through which the mass storage device is visible to the application, and wherein the device interface is implemented by a corresponding device thread that is separately schedulable from other device threads for execution by the server;
   wherein said mass storage device is accessible via said server by a user who interacts with said application via said stateless client; and
   wherein the program instructions are executable by the server to further store data to said mass storage device via said stateless client in response to said user's interaction with said application.

16. The computer-accessible storage medium as recited in claim 15, wherein said mass storage device is locally coupled to said stateless client via a Universal Serial Bus (USB) or IEEE 1394 interface.

17. The computer-accessible storage medium as recited in claim 15, wherein said mass storage device employs magnetic media, optical media, or solid-state storage media.

18. The computer-accessible storage medium as recited in claim 15, wherein to detect the presence of the mass storage device, the program instructions are executable by the server to detect a hotplugging event generated in response to coupling of the mass storage device to the stateless client.

19. The computer-accessible storage medium as recited in claim 18, wherein in response to detecting the hotplugging event, the program instructions are executable by the server to create the device interface through which the mass storage device is visible to the application.

20. The computer-accessible storage medium as recited in claim 15, wherein said server provides a kernel execution mode and a user execution mode, and wherein said program instructions the program instructions are executable by the server to implement:
   a storage service daemon, wherein said storage service daemon executes in user execution mode;
   a kernel interface that executes in kernel execution mode and is configured to provide to applications that execute on the server a public interface to the mass storage device coupled to the stateless client; and
   a daemon interface that executes in kernel execution mode and is configured to convey device access requests from the kernel interface to the storage service daemon, wherein the interface between daemon interface and the storage service daemon is private with respect to applications that execute on the server.

21. The computer-accessible storage medium as recited in claim 20, wherein the storage service daemon comprises:
   a plurality of device threads, each corresponding to a respective device interface, and each device thread being separately schedulable from other device threads for execution by the server;
   a remote disk driver that, upon receiving an access request from a particular device thread, is configured to assemble a command for the mass storage device according to a command set implemented by the mass storage device;
   a protocol driver that is configured to assemble one or more commands received from the remote disk driver into a transaction for the mass storage device according to a peripheral interface with which the mass storage device is coupled to the stateless client.

* * * * *